United States Patent Office 3,127,111
Patented Mar. 31, 1964

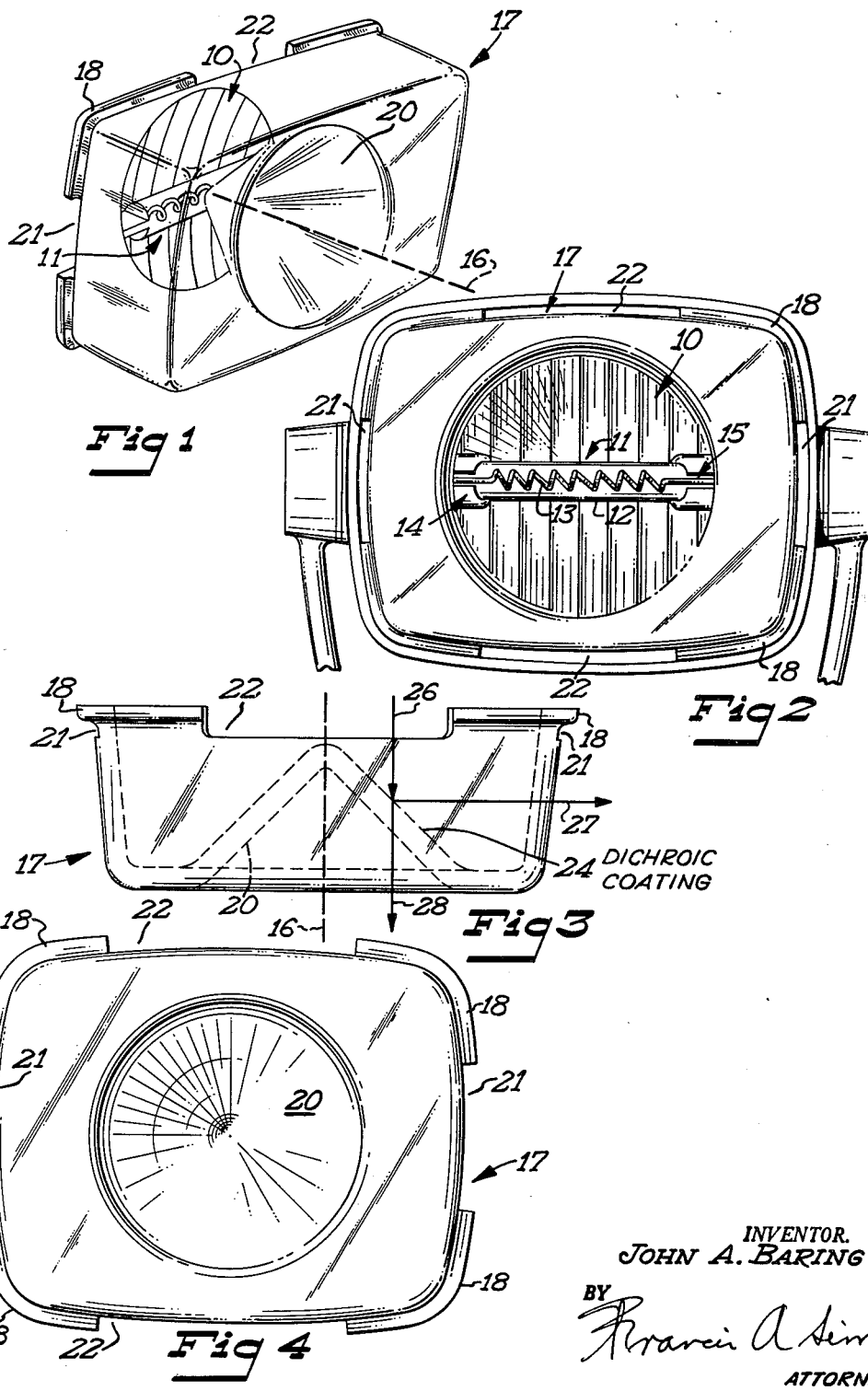

3,127,111
PHOTOGRAPHIC LIGHT UNIT
John A. Baring, Golden, Colo., assignor to Minneapolis-Honeywell Regulator Company, Minneapolis, Minn., a corporation of Delaware
Filed Aug. 17, 1961, Ser. No. 132,210
2 Claims. (Cl. 240—1.3)

The present invention is concerned with a photographic light unit and particularly with a photographic light unit having a high intensity source of illumination which, in combination with a reflector, directs light generally along an axis toward the subject to be photographed to thereby illuminate the subject, the light thus produced being reflected from the subject to be captured by the camera lens and thus produce an image upon the film disposed within an associated camera.

By way of specific example, a light source, of the flood type, can be readily utilized with a movie camera. In such an instance, the flood lamp is continuously energized and produces extremely high intensity, continuous light to illuminate the subject being photographed by the movie camera. With this particular example, that is a flood light utilized in conjunction with a movie camera, the subject being photographed is subjected to a continuous very brilliant light. Thus, the subject to be photographed is not only subjected to extremely brilliant illumination, but also to a great deal of discomforting heat energy which is radiated upon the subject. More specifically, the source of illumination comprises a bulb containing a filament adapted to be heated to an incandescent state and thus emit electromagnetic radiation, a portion of which constitutes the illumination to be reflected by the subject to produce an image on the film contained within the camera. A further portion of the electromagnetic radiation is in the form of heat energy, for example infrared wave energy. This energy produces an unpleasant sensation at the subject being photographed and, depending upon the intensity of such radiation, may in fact be dangerous, for example to the delicate tissues of the eye of the subject being photographed.

The present invention is directed to an improved photographic light unit of the above general type in which a light controlling means is disposed between the light source and the subject being photographed, this means being constructed and arranged to allow passage of the majority of the electromagnetic wave energy emitted from the light source, while reflecting the heat wave energy. Furthermore, this member is constructed and arranged so as to reflect this heat wave energy generally away from the axis of the photographic light unit, thus preventing undue heating of the filament of the source of illumination, as well as reflecting this energy away from the subject to be photographed.

More specifically, the preferred embodiment of the present invention utilizes a generally transparent box shaped member having an internally disposed cone shaped portion, this cone shaped portion being coated to form a surface which may be characterized as a dichroic coating, this coating having the property and characteristic of reflecting infrared wave energy while allowing the majority of the remaining wave energy to pass through the cone shaped member to illuminate the subject to be photographed.

The present invention will be apparent to those skilled in the art upon reference to the following specification, claims, and drawings, of which:

FIGURE 1 is a perspective view of my photographic light unit,

FIGURE 2 is a front view of the photographic light unit of FIGURE 1, showing the construction of the light source and its reflector, and showing support means for the unit, the support means not being shown in FIGURE 1, FIGURE 3 is a view of the light transparent member, showing the cone shaped reflector provided with the dichroic coating, and FIGURE 4 is a front view of the transparent member of FIGURE 3.

Referring now to FIGURE 1, reference numeral 10 identifies generally a reflector which cooperates with an electrically energizable source of illumination in the form of a bulb 11.

Referring to FIGURE 2, bulb 11 can be seen to include a glass envelope 12 within which a heavy filament 13 is disposed, the filament 13 being connected to terminal portions 14 and 15 at opposite ends of the light source 11. These terminal portions 14 and 15 cooperate with socket members, not shown, mounted on the reflector 10 and thus the light source 11 is fixed in relation to reflector 10 such that light is generally emitted along an axis defined by the broken line 16, see FIGURES 1 and 3.

Thus, upon energization of light source 11, electromagnetic wave energy is generated by the power dissipated at the filament 13 and this electromagnetic wave energy is directed generally along axis 16 thus providing a directional light source to be pointed at the subject to be photographed. For purposes of simplicity, the electrical circuitry including the socket members mounting bulb 11 have not been shown. This may consist simply of a two conductor cord incorporating an on—off switch adapted to directly connect filament 11 across a source of alternating voltage, for example a 110 volt 60 cycle source of alternating voltage.

Disclosed generally in front of the reflector-light source combination is a transparent box-like member identified generally by means of reference numeral 17. This box-like member is adapted to be mounted at a ridge portion 18 to the reflector by a conventional means. Member 17 incudes an internally directed cone portion 20 whose apex 21 is generally in line with axis 16, the axis of cone 20 thus substantially coinciding with the axis 16.

FIGURES 3 and 4 show member 17 after the member has been removed from the reflector and flash tube structure. As seen in FIGURE 3, member 17 is generally box-like in construction, being provided with the inwardly disposed cone 20. Likewise, the member 17 is provided with openings 21 at the sides of the member and openings 22 disposed at the top and bottom of the member (see FIGURE 4).

In a particular construction of the present invention member 17 has been constructed of Pyrex glass wherein a dichroic coating has been vacuum deposited on the inside surface of cone 20, the dichroic coating being identified by reference numeral 24 in FIGURE 3. This dichroic coating has the property of reflecting only the heat wave energy, for example infrared, contained in the electromagnetic wave energy being radiated from the light source 11. Light source 11 of necessity radiates electromagnetic wave energy in a rather wide spectral band and to simplify the explanation, an arrow, designated 26 in FIGURE 3 represents the entire spectrum of electromagnetic wave energy radiated from light source 11. This energy impinges upon dichroic coating 24 and the heat portion thereof is reflected generally away from axis 16, this being represented by arrow 27. The remaining portion of the electromagnetic wave energy passes through member 17, unrestricted, and this portion is represented by reference numeral 28. Thus, the subject to be photographed is not subjected to the unpleasant heat energy produced by light source 11 and, insofar as the film in the camera is concerned, the subject is properly illuminated for photographic purposes.

While the preferred embodiment of the present invention utilizes a cone portion 20, the entire interior surface of which is covered by the dichroic coating 24, it is within the teachings of the present invention to provide a surface which may be inclined or tilted in any manner to the optical axis 16 such that the heat energy is not only prevented from passing on to the subject to be photographed, but is likewise reflected away from the source 11, in the manner represented by arrow 27. In this manner, overheating of the source 11, to thus shorten the useful life of the source, is likewise avoided. Having shown only the preferred embodiment of my invention, I intend that the scope of my invention be limited by the scope of the appended claims.

I claim as my invention:

1. In a photographic light unit adapted to provide illumination of a subject to be photographed, an electrically energizable source of illumination of the type which emits electromagnetic wave energy including heat wave energy, a reflector cooperating with said source of illumination to direct said energy forwardly along an axis directed toward the subject to be photographed, an open end box-like housing of transparent material, said housing having side walls and having a front surface which includes an inclined heat reflecting member, means including said side walls mounting said housing in front of said reflector with the open end thereof facing said reflector, and with said heat reflecting member inclined to said axis, said heat reflecting member being formed of a material which selectively reflects only the heat wave energy through the side walls of said housing away from said axis and away from both said source of illumination and the subject to be photographed, allowing the subject to be illuminated by the remainder of said wave energy to thereby prevent undue heating of the source and to prevent heating of the subject to be photographed.

2. In a photographic light unit for use to illuminate a subject to be photographed, a reflector, an electrically energizable source of illumination mounted within said reflector, said source being effective upon energization thereof to emit electromagnetic wave energy including heat wave energy forwardly along an energy axis directed toward the subject to be photographed, a generally transparent box-like housing having side walls and having an inwardly directed cone at the front surface thereof, means including said side walls mounting said housing on said reflector, said side walls spacing said cone forward to said reflector with said cone mounted with the axis of said cone coincident to said energy axis and in front of said source of illumination, and a dichroic reflective coating disposed on the surface of said cone, said coating having the property of selectively reflecting said heat wave energy at an angle to said energy axis through the side walls of said housing while allowing the subject to be illuminated by the remainder of said electromagnetic wave energy.

References Cited in the file of this patent
UNITED STATES PATENTS

| | | |
|---|---|---|
| 1,588,816 | Sisson | June 15, 1926 |
| 2,552,185 | Koch | May 8, 1951 |
| 2,798,943 | Prideaux | July 9, 1957 |
| 2,852,980 | Schroeder | Sept. 23, 1958 |